Patented Jan. 16, 1945

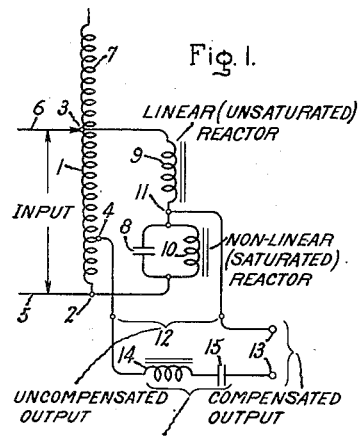
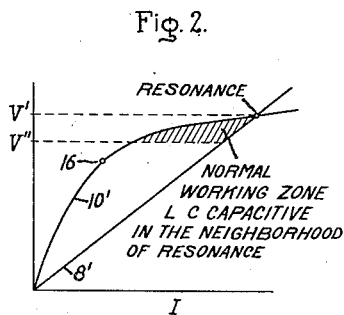
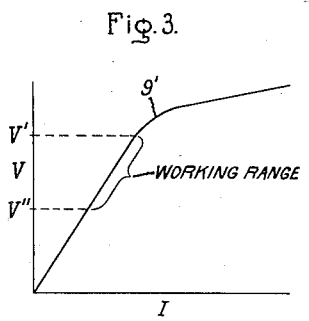
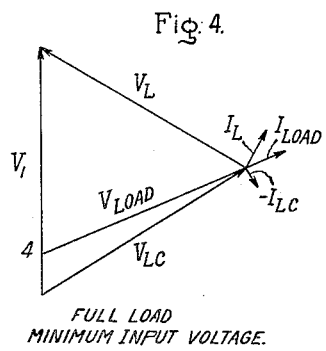
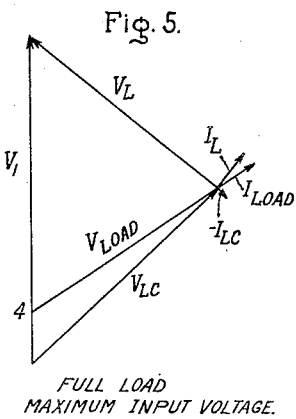
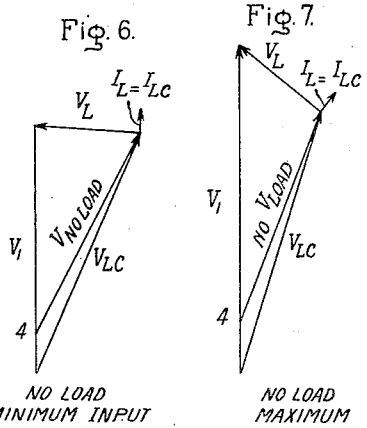
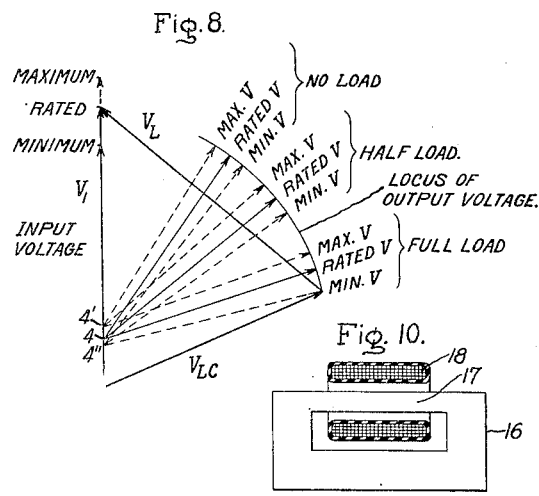
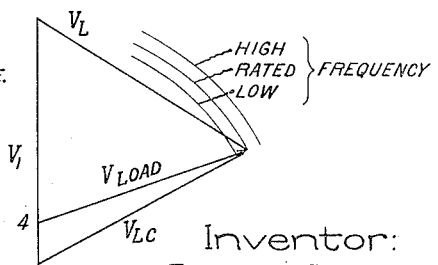

2,367,625

UNITED STATES PATENT OFFICE 2,367,625

VOLTAGE REGULATOR CIRCUIT

Thomas T. Short, Fort Wayne, Ind., assignor to General Electric Company, a corporation of New York Application March 13, 1943, Serial No. 479,047

12 Claims. (Cl. 171—242)

This invention relates to voltage regulator circuits and more particularly to an improved static alternating current circuit for converting a variable input voltage to a constant output voltage.

There are a relatively large number of circuits of this type both on paper and on the market. Most of them employ capacitors and both linear or non-saturated and non-linear or saturated reactors. In accordance with the present invention there is provided a new and improved circuit of this general type which is easy to manufacture, which uses a relatively small amount of material, which is light in weight and which has improved regulating characteristics. It is very fast acting, and tests have shown that for substantially instantaneous changes in input voltage of relatively large per cent the output voltage stabilizes and returns approximately to normal in three cycles based on a frequency of the voltage of sixty cycles per second. It is a very safe circuit in that the no-load or open circuit voltage does not tend to rise above normal and furthermore its short circuit current may be limited to about 130 per cent of rated current and the output voltage collapses if the current tries to exceed this value. It is particularly well adapted for supplying resistance or unity power factor loads such as the filaments of electric discharge valves and also the plate circuits of high vacuum tubes. In general, if the power factor is lagging the voltage level falls somewhat, and if the power factor is leading the voltage level increases. A change from unity to nine-tenths power factor causes a change of about one per cent in the output voltage level.

The basic circuit is somewhat sensitive to frequency variations, the output voltage level changing about seven per cent for a change in frequency of five per cent, the change in output voltage being an increase with an increase in frequency and a decrease with a decrease in frequency. However, the regulation of the circuit, that is, the variations in output voltage from the extreme operating conditions of minimum input voltage with full load to maximum input voltage at no load stays about the same at different frequencies, the only material difference being that the output voltage level is different for the different input frequencies. However, the change in voltage level with changes in frequency may easily be compensated for so that the compensated system has an output voltage which is substantially independent of reasonable variations in frequency. The frequency compensating means also serves to suppress higher harmonics which tend to be present because of the effect of magnetic saturation in the circuit.

The principal elements of the circuit are a capacitor and a pair of iron core reactors. The working portion of the volt-ampere characteristic of one of the reactors is linear; in other words, the working range is below the knee of the saturation curve and therefore during normal operations the core is unsaturated. This reactor is connected in series circuit relation with the capacitor. The other reactor, which is connected in parallel circuit relation with the capacitor, has its normal working range above the knee of its saturation curve so that it operates with its core saturated. The volt-ampere characteristic of this reactor intersects that of the capacitor so as to provide a resonance point and the normal working range of these two parallel-connected devices is between the knee of the saturation curve and the resonance point.

An object of the invention is to provide a new and improved static voltage regulator circuit.

Another object of the invention is to provide a simple and inexpensive static voltage regulator circuit having improved regulating characteristics.

Another object of the invention is to provide an inexpensive and light-weight static voltage regulator circuit.

The invention will be better understood from the following description taken in connection with the accompanying drawing and its scope will be pointed out in the appended claims.

In the drawing Fig. 1 shows the circuit diagram of an embodiment of the invention, Fig. 2 shows the volt-ampere characteristic of the capacitor and the non-linear or saturated reactor, Fig. 3 shows the volt-ampere characteristic of the linear or non-saturated reactor, Fig. 4 is a vector diagram illustrating the operation at full load with minimum input voltage, Fig. 5 is a similar diagram for full load with maximum input voltage, Fig. 6 is a similar diagram for no load with minimum input voltage, Fig. 7 is a similar diagram for no load with maximum input voltage, Fig. 8 is a combination of Figs. 4-7, inclusive, in the form of a locus vector diagram, Fig. 9 is similar to Fig. 8 but shows the effect of variations in frequency, and Fig. 10 shows a preferred form of the saturated reactor 10.

Referring now to the drawing and more particularly to Fig. 1, there is shown therein an input transformer 1 which for the sake of simplicity is shown as an autotransformer having terminals 2 and 3 which serve both as input and output terminals. It is also provided with a third terminal 4 intermediate the other two. Connected to the terminals 2 and 3 are conductors 5 and 6 of an input circuit such, for example, as with ordinary 110-volt 60 cycle per second circuit. If it should be desired to adapt the regulator for operation with input circuits having different voltages the conductor 6 could be connected to other points on the winding 1 and for this purpose the winding has been shown with an extension 7 for adapting it for operation with higher input voltages. Serially connected between the terminals 2 and 3 are a capacitor 8 and a linear reactor 9, while connected in parallel circuit relation with the capacitor 8 is a non-linear reactor 10. Connected between the terminal 4 and the junction of the two reactors at 11 is an output circuit having uncompensated output terminals 12 and compensated output terminals 13 between which there is connected a frequency compensator in the form of a linear reactor 14 in series with a capacitor 15.

For certain applications it will be more economical to have the voltage of the capacitor 8 substantially higher than the voltage of the reactor 10. In such cases the reactor can be in the form of a voltage step-up transformer whose magnetizing or exciting reactance is the equivalent of the desired inductive reactance and the voltage of whose output or secondary winding will correspond to the voltage of the capacitor, the latter being connected across the winding. Such a transformer may either be an autotransformer, or an ordinary two-winding transformer, as is common practice. The volt-ampere characteristic of the non-linear reactor 10 is shown as saturation curve 10' in Fig. 2 and it is the curved shape of this characteristic which gives rise to the designation of the reactor 10 as non-linear. The volt-ampere characteristic of the capacitor 8 is shown by the curve 8' in Fig. 2 and this is a straight line as capacitors are linear reactances. The two volt-ampere characteristics intersect at a resonance point at which their respective reactive or zero power factor currents are equal but as these currents are opposite in phase the resultant reactive current through the two devices is zero and this occurs at the voltage V'. The saturation characteristic 10' is substantially straight up to the point 16 corresponding generally to the knee of the curve above which the curve again becomes substantially straight and the normal working zone or range of the combination of the capacitor 8 and reactor 10 is shown by the shaded portion between the two curves. Its lower limit, corresponding to a voltage V'', is not far above the knee of the curve 10'. Throughout this working range it will be observed that the capacitor current is higher than the reactor current so that the parallel circuit, which may conveniently be designated the LC circuit (L being the symbol for inductance and C for capacitance), has an effective capacitive reactance throughout its normal working range. Above resonance these conditions are reversed and the inductive current exceeds the capacitive current so that the LC combination has a net inductive reactance.

The volt-ampere characteristic of the linear reactor 9 is shown by the curve 9' in Fig. 3 and the working range of this device is on the linear portion below the knee of the curve, thus showing that the normal operating range of the device is below saturation. The resultant volt-ampere characteristic of the LC combination is such that when the voltage increases from V'' to V' the net current decreases from a substantial value to almost zero, thus showing that the effective impedance of the LC combination increases very materially, whereas when the voltage of the reactor 9 increases in Fig. 3 from VII to V' the current increases in exactly the same proportion showing that the impedance stays constant.

It should, of course, be understood that the curves shown in Figs. 2 and 3 and the following vector diagrams ignore the effect of harmonics or changes in wave shape produced by saturation. Ordinarily, these effects are small so that the curves and diagrams give a fairly true qualitative picture of the operation.

The principal voltages and currents for full-load operation at minimum input voltage are shown in Fig. 4, $V_1$ corresponding to the voltage of the winding 1 and being equal to the vector sum of the voltages $V_L$ and $V_{LC}$ corresponding respectively to the voltages across the reactor 9 and the voltage across the LC combination consisting of the reactor 10 and the capacitor 8. The load is assumed to be a unity power factor or resistance load so that the current $I_{load}$ and the voltage $V_{load}$ are in phase with each other. The current $I_L$ in the reactor 9 is shown lagging the voltage $V_L$ by ninety degrees, the vector rotation being in the conventional counterclockwise direction. The current $I_{LC}$ actually leads the voltage $V_{LC}$ by substantially ninety degrees but as the load current is the vector difference between the current $I_L$ and the current $I_{LC}$, only $-I_{LC}$ has been shown and, as will be seen, the vector sum of $I_L$ and $-I_{LC}$ equals $I_{load}$.

In Fig. 5 is shown the effect of increasing the input voltage to its maximum value without changing the load. As shown, the input voltage has increased about thirty-three per cent and therefore the voltage of the point 4 has also increased about thirty-three per cent. However, the characteristic of the LC combination is such that its voltage cannot change very much so that the vectors $V_{LC}$ and $V_{load}$ advance in phase and the principal change in voltage magnitude, occurs across $V_L$. In practice, the shift in the voltage of the tap 4 with changes in input voltage combined with the shift in phase angle of the voltages across the load, across the reactor 9 and across the LC combination are such that the voltage across the load stays very nearly constant.

If the load increases beyond full load the diagram tends to collapse because as the resistance between the tap 4 and the junction point 11 decreases the voltage difference between these points would decrease until at short circuit there will be substantially no difference between the voltage of these points, and under these conditions it will also be noted that the voltages $V_L$ and $V_{LC}$ are limited by the winding 1 and cannot attain excessive values.

At no load the currents in reactor 9 and the LC combination must be equal to each other as there is no load current. Fig. 6 illustrates this condition for minimum input voltage. $I_L$ lags $V_L$ by ninety degrees and it equals $I_{LC}$ which leads $V_{LC}$ by a small angle indicating that the operation of LC is below but almost at the resonance point. Thus the principal component of the LC current is the current which supplies the losses in the LC combination. In other words, the principal component is a unity power factor component and the quadrature or capacitive component is very small because of the very high effective capacitive reactance.

Fig. 7 illustrates the no-load operation with maximum input voltage and for purposes of illustration this represents a condition in which the LC combination has passed through resonance and is now an inductive combination. Thus, both $I_L$ and $I_{LC}$ which, of course, are one and the same current at no load are now lagging their respective voltages, $I_L$ lagging $V_L$ by ninety degrees and $I_{LC}$ lagging $V_{LC}$ by a small angle showing that the operation is but slightly above the resonance point at which the principal component of the LC current is the unity power factor loss component of the current.

Figs. 4, 5, 6 and 7 can be combined as in Fig. 8 into a single diagram showing an arc which represents the locus of the output or load voltage for three conditions of load at three different values of input voltage, namely full load, half load and no load at either rated input voltage, maximum input voltage or minimum input voltage. In practice the location of the point 4 can be determined by selecting the point which gives zero regulation for the two conditions of rated input voltage at no load and at full load. For intermediate values of load at the same voltage the regulation or change in output voltage will be very small and for variations in input voltage above and below rated voltage both terminals of the load voltage vector will shift, the right-hand terminal corresponding to the voltage of the junction point 11 shifting along the locus curve, and the point 4 shifting by reason of the change in input voltage. That is to say, the point 4 does not actually change but due to the change in magnitude of the voltage of the winding 1 the magnitude of the voltage of the point 4 will also change, thus in effect shifting this point on the vector diagram.

From the above description it will be seen that the principal element or combination of the circuit which inherently resists voltage changes is the LC combination, this combination having a very wide change in impedance over a relatively small range in voltage. If now the input frequency increases it has the effect of raising the curve 10' and lowering the curve 8' in Fig. 2, thus raising the voltage of the resonant point and in effect raising the voltage of the working range of the LC combination. The result is that an increase in frequency tends to raise the voltage level of the regulating circuit and conversely a decrease in frequency tends to lower the voltage level of the system. However, the regulation, that is, the degree or per cent change in load voltage between full load and no load and between maximum input voltage and minimum input voltage for any frequency remains substantially the same so that, as shown in Fig. 9, the locus curves or arcs of the terminal of the output or load voltage vector remain substantially parallel with each other at different frequencies.

If the frequency compensator, consisting of the reactor 14 and the capacitor 15, is tuned for series resonance at the minimum operating frequency of the supply source, then at this frequency the uncompensated and the compensated voltages between the terminals 12 and 13 respectively are substantially equal because the effective impedance of the series resonant circuit is substantially zero. However, as the frequency increases the series resonant circuit becomes more and more of an inductive reactance, that is to say, its net inductive reactance increases, thus producing a voltage drop due to the load current between the terminals 12 and 13 which at any load is proportional to the increase in frequency so that over a substantial frequency range the voltage between the output terminals 13 will remain substantially constant.

Another advantage of the frequency compensator is that higher harmonics which may exist in the load current due to the non-linear saturating characteristic of the reactor 10 will tend to be blocked out by the frequency compensator because as has been explained above, at higher frequencies the compensator is predominantly inductive so that it offers a relatively high impedance to the flow of higher frequency currents.

The reactor 10, having a saturated core, necessarily operates this core at relatively high flux density and with an ordinary core which has a uniform cross sectional area excessive heating sometimes occurs as a result of this high flux density. However, if the cross sectional area of the core 16 in Fig. 10 is reduced as at 17 where the winding 18 surrounds it for approximately 15 to 30 per cent of the total effective length of the magnetic circuit, then the average flux density in the core will be greatly reduced with a corresponding decrease in temperature rise. This arrangement actually improves the voltage regulation in that the knee 16 of the volt-ampere curve 10' of Fig. 2 will be somewhat sharper, thereby making the difference between V' and V'''' less than is shown in Fig. 2.

While there has been shown and described a particular embodiment of this invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, means for delivering an alternating voltage having a predetermined normal value, means for tapping off a predetermined fraction of said voltage, a pair of opposite sign reactance means serially connected across said voltage, a variable load output circuit connected between said fractional voltage tapping means and the junction of said two reactance means, one of said reactance means having an increasing reactance with increasing voltage and current.

2. In combination, a transformer winding having a normal voltage, means having a relatively linear reactance of a given sign, means having a relatively non-linear effective reactance of opposite sign, said two reactance means being connected in series across said transformer winding, an intermediate tap on said winding, a variable load connected between said tap and the junction of said two reactance means, said two reactance means being so correlated to said load and to the normal voltage of said transformer winding that at full load the vector voltages across said two reactance means form a substantially equilateral triangle with the vector voltage of said transformer winding, said non-linear reactance means being such that its reactance increases with its voltage.

3. In combination, a transformer winding having three terminals one of which is intermediate the other two, a reactor and a parallel ferroresonant type circuit connected in series across said other two terminals, and an output circuit connected between said intermediate point and the junction between said reactor and ferro-resonant type circuit.

4. In combination, a relatively linear reactor and a relatively non-linear reactor connected in series, a capacitor effectively connected in parallel with said non-linear reactor, means for impressing an input voltage across said serially connected reactors, means for deriving an output voltage from between the junction of said reactors and an intermediate point on said input voltage impressing means, said non-linear reactor and capacitor having a normal operating range which has a resultant capacitive reactance and which extends between resonance as the upper limit and the knee of the saturation curve of the non-linear reactor as the lower limit.

5. In combination, a transformer having input terminals for connection to a supply circuit whose voltage is subject to fluctuations above and below a normal rated value, said transformer having a winding provided with three output terminals one of which is intermediate the other two, a reactor and a capacitor connected in series across said other two terminals, a variable output circuit connected between said intermediate terminal and the junction between said capacitor and reactor, and a saturating reactor connected in shunt circuit relation to said capacitor, said saturating reactor and capacitor operating in the neighborhood of resonance with maximum operating voltage across said input terminals and no load on said output circuit, said saturating reactor operating above the knee of its volt-ampere characteristic with minimum operating voltage across said input terminal and full load on said output circuit, said intermediate terminal being so located that the voltage across said output circuit is the same at no load and full load thereon with rated voltage across said input terminals.

6. In combination, a transformer winding, a linear non-saturating iron core reactor, a non-linear saturating iron core reactor, said reactors being connected in series across said transformer winding, a capacitor connected in shunt circuit relation with said non-linear reactor, a pair of output terminals connected respectively to the junction of said reactors and to an intermediate point in said transformer winding, and means for exciting said transformer winding.

7. In combination, a static voltage regulator circuit having input terminals adapted to receive a variable magnitude and variable frequency alternating voltage, said regulator having output terminals for delivering a voltage which is substantially independent of load and input voltage variations, and means for compensating said regulator for said variations in frequency comprising a reactor and a capacitor connected in series with said output terminals, said reactor and capacitor being resonant at the minimum input frequency.

8. A voltage regulator comprising, in combination, a pair of serially-connected windings for connection across a variable voltage input circuit, one of said windings having an iron core with a saturated section, a third winding serially connected with said winding which has a core with a saturated section for connection across a constant voltage output circuit, and capacitive-reactance means effectively connected in parallel with said winding which has a core with a saturated section.

9. A voltage regulator comprising, in combination, a pair of serially-connected windings for connection across a variable voltage input circuit, one of said windings having a closed iron core with a saturated section, a third winding serially connected with said winding which has a core with a saturated section for connection across a constant voltage output circuit which excludes the other of said pair of windings, and capacitive-reactance means effectively connected in parallel with said winding which has a core with a saturated section, said capacitive-reactance means and its effectively parallel-connected winding having intersecting volt-ampere characteristics and normally operating at voltage and current values which are below those which correspond to the intersection of their respective volt-ampere characteristics.

10. A voltage regulator comprising, in combination, a pair of serially-connected windings for connection across a variable voltage alternating-current supply circuit, one of said windings having a normally saturated iron core, the other winding having an unsaturated iron core, a capacitor effectively coupled in shunt circuit relation with the winding having the saturated iron core, said capacitor and its effectively shunt-connected winding having a net capacitive-reactance in the neighborhood of resonance, a constant voltage output circuit connected to have its major component of voltage supplied by the winding with a saturated core, and a third winding whose voltage varies with variations in input voltage connected in said output circuit.

11. A voltage regulator comprising, in combination, a pair of serially-connected windings for connection across a variable voltage alternating-current supply circuit, one of said windings having a normally saturated iron core, the other winding having an unsaturated iron core, a capacitor effectively connected in shunt circuit relation with the winding having the saturated iron core, said capacitor and its effectively shunt connected winding having a net capacitive reactance in the neighborhood of resonance, a constant voltage output circuit connected to have its major component of voltage supplied by the winding with a saturated core, and a third winding whose voltage varies with variations in input voltage connected in said output circuit, said output circuit excluding said winding with an unsaturated core.

12. An alternating-current voltage regulator comprising, in combination, a circuit having an input end and an output end, a pair of windings serially connected in said circuit, a third winding connected across said circuit on the output side of one of said serially-connected windings and on the input side of the other of said serially-connected windings, said third winding having an iron core with a normally saturated section, and capacitive-reactance means effectively connected in parallel with said third winding, the net reactance of said third winding and capacitive-reactance means being capacitive and having a current which varies inversely with the voltage across said third winding.

THOMAS T. SHORT.